Oct. 31, 1933.  O. B. HUNT  1,933,265
AUTOMATIC NONBACKING AUTOMOBILE BRAKE
Filed Sept. 14, 1932
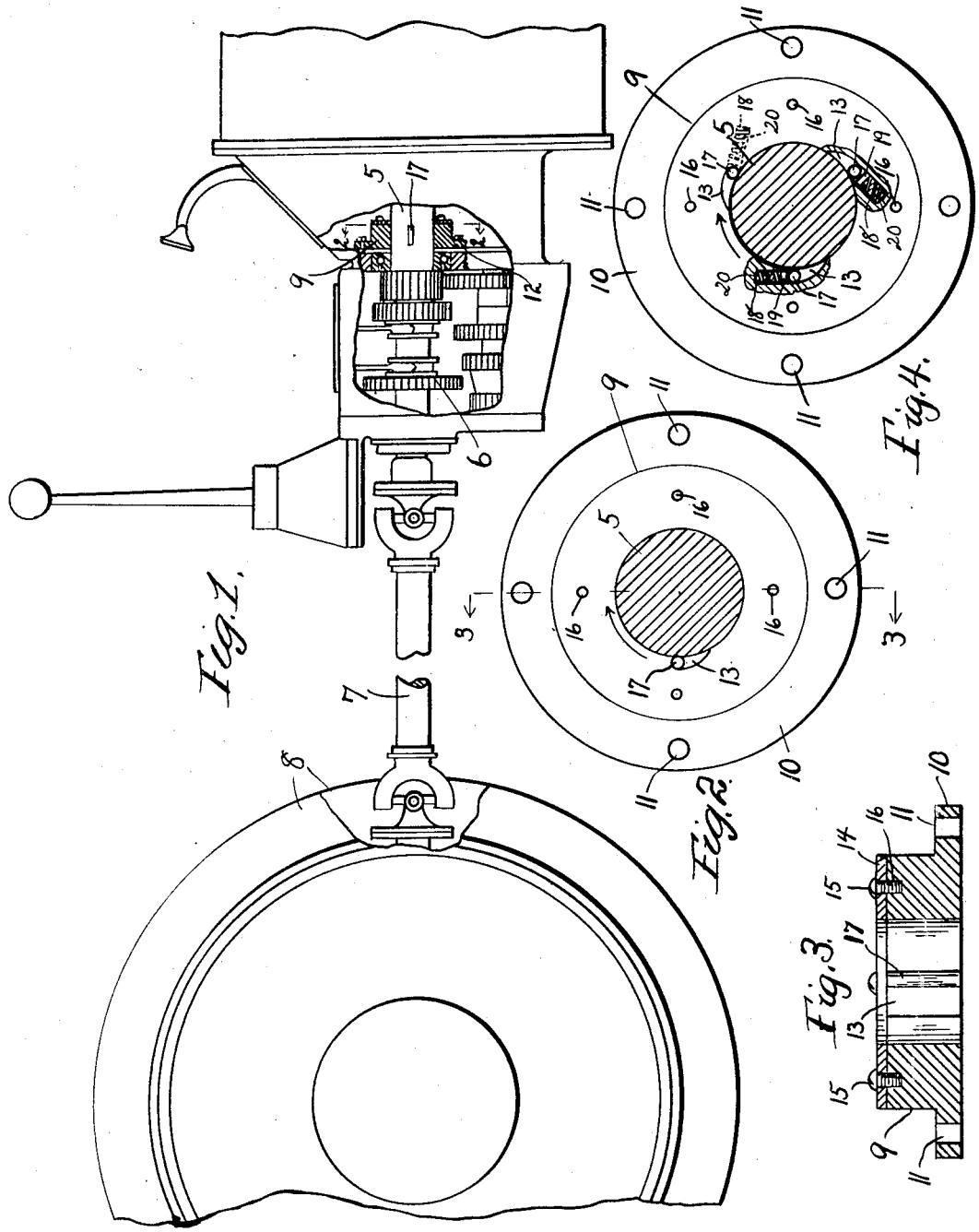
Inventor
Otis B. Hunt
By W. W. Williamson
Atty

UNITED STATES PATENT OFFICE 1,933,265

AUTOMATIC NONBACKING AUTOMOBILE BRAKE

Otis B. Hunt, Croydon, Pa.

Application September 14, 1932
Serial No. 633,028

2 Claims. (Cl. 192—4)

My invention relates to new and useful improvements in an automatic non-backing automobile brake and has for one of its objects to provide an exceedingly simple and effective device of this character which will prevent the backward drifting of an automobile when stopped on an incline or grade providing the transmission gears are in mesh for forward movement of the automobile and even though the clutch is disengaged.

Another object of the invention is to provide a full automatical device which will not require disengagement when it is desired to move the automobile in a reverse direction by means of the motor of the vehicle.

A further object of the invention is to provide means which cooperates with a part of the automobile that always revolves in one direction, said means preventing backward drifting of the automobile during the time the driving mechanism is unclutched from the motor.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which:—

Fig. 1 is a view partly in section and partly in elevation of the mechanism of an automobile which transmits motion from the motor to the wheels to clearly illustrate the location of the invention.

Fig. 2 is an enlarged sectional view on the line 2—2 of Fig. 1.

Fig. 3 is a section on the line 3—3 of Fig. 2.

Fig. 4 is a view similar to Fig. 2, of a modification, with parts broken away to illustrate structural details.

In carrying out my invention as herein embodied, 5 represents the clutch shaft which is connected with the motor of an automobile through the medium of any ordinary or well known clutch and from which power is then transmitted through the transmission mechanism 6 to the propeller shaft 7 and finally to the wheels 8.

At some suitable location, as within the transmission housing, and surrounding the clutch shaft 5 is a collar 9 provided with a flange 10 having holes 11 therein through which fastening devices 12, such as studs, may pass for securing the collar to a bearing or other suitable support within the transmission housing.

In the inner face of the collar is formed a groove 13 and said groove preferably extends completely through the collar from one end or face to the opposite end or face so that one end of said groove is closed by the support to which the collar is fastened and the other end may be closed by a cap 14 in the form of a washer which is secured to a face of the collar by screws 15 or their equivalent passing through holes in said cap and screwed into threaded holes in the collar.

At one side, the groove 13 is sufficiently large to loosely receive a roller 17 so that the latter is free to revolve, but said groove gradually diminishes in cross sectional area toward the opposite side forming, in effect, a wedge shaped chamber just outside of the clutch shaft 5 and the point or toe of the wedge extends in a direction counter-clock-wise from the larger or heel side of the groove. By reference to Figs. 2 and 4, it will be seen that the clutch shaft revolves clockwise and never revolves in the opposite direction unless motion is transmitted thereto from the wheels of the automobile through the proper shaft and the transmission gears at a time when the motor is stopped or declutched from the transmission gears and the automobile tends to drift rearwardly.

It is a well known fact with persons driving automobiles that when it becomes necessary to stop on a grade or incline, the automobile will drift backward as soon as the brakes are released. Generally when a person has to stop an automobile on a grade and is waiting to proceed, the transmission gears are shifted to what is known as low speed with the clutch thrown out and the foot brakes applied. When ready to start, the brakes must be released, the engine accelerated and the clutch thrown in. Between the time the brakes are released and the foot is applied to the accelerator, the automobile may drift backward and may cause delays or accidents.

By the use of my invention, all of these disadvantages are overcome since as soon as the automobile is stopped the roller 17, due to the location of the groove 13 at one side of the horizontal cross-section of the clutch shaft 5, comes to rest between the clutch shaft 5 and the opposite wall of the groove 13, although movement of the roller may be not over one hundredth of an inch, therefore, if the automobile develops the tendency to move rearward, counter-clockwise movement of the clutch shaft 5 is prevented and the automobile is held against rearward movement but as soon as the motor is clutched to the driveway mechanism, the clutch shaft 5 can revolve without any interference.

Any number of rollers 17 may be used as suggested in Fig. 4, but in such a case the majority of the rollers will have to be spring pressed toward the toes of their respective grooves 13. For this purpose, I have shown holes 18 formed in the collar 9 which communicate with the grooves preferably midway their lengths. In each hole 18 is a plunger 19 coacting with its roller and a spring 20 to force the plunger outward. The operation is practically the same but the springs insure the movements of the rollers toward the toes of their respective grooves whenever the shaft starts to turn counterclock-wise.

Of course I do not wish to be limited to the exact details of construction herein shown and described as these may be varied within the limits of the appended claims without departing from the spirit of my invention.

Having thus fully described my invention, what I claim as new and useful is:—

1. In combination, an automobile including a shaft to be driven in one direction at all times and a propeller shaft and a variable transmission, a housing having a bore for registration with the first mentioned shaft and further provided with a groove extending from end to end and in communication with the bore, said housing adapted to be supported against rotation and one end of the groove being closed by the support for the housing, means to close the other end of the groove, and means in the groove for coaction with the first mentioned shaft to prevent retrograde rotation thereof.

2. In an automatic non-backing automobile brake, the combination of an automobile including a clutch shaft normally always driven clockwise and a propeller shaft and a transmission mechanism, a housing having a bore therethrough for registration with the clutch shaft and adapted to be supported in a stationary position, said housing having a groove therein communicating with the bore, said groove being located at one side of the clutch shaft where the surface thereof is normally moving in a generally upwardly direction and said groove decreasing in size downwardly or counter-clockwise, one end of said groove being closed by the support for the housing, means removably mounted on the housing to close the opposite end, and a roller in said groove and of a size to freely revolve in the heel end of the groove and coacting with the clutch shaft to prevent counter-clockwise movement thereof which will hold the automobile from drifting backward while the transmission mechanism is in operative condition.

OTIS B. HUNT.